(12) United States Patent
Yemawar (10) Patent No.: US 11,990,734 B2
(45) Date of Patent: May 21, 2024

(54) CABLE GLAND FOR ARMORED CABLE

(71) Applicant: Eaton Intelligent Power Limited, Dublin (IE)

(72) Inventor: Saurabh Suresh Yemawar, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 18/046,024

(22) Filed: Oct. 12, 2022

(65) Prior Publication Data

US 2023/0110086 A1     Apr. 13, 2023

(30) Foreign Application Priority Data

Oct. 12, 2021   (IN) .............................. 202111046444

(51) Int. Cl.
*H02G 15/02*     (2006.01)
*H02G 15/007*    (2006.01)

(52) U.S. Cl.
CPC .................................. *H02G 15/02* (2013.01)

(58) Field of Classification Search
CPC ..................................................... H02G 15/02
USPC ......................................................... 174/171
See application file for complete search history.

(56) References Cited

U.S. PATENT DOCUMENTS

| | | | | |
|---|---|---|---|---|
| 4,490,576 A * | 12/1984 | Bolante | ................ | H02G 3/0616 411/525 |
| 4,515,991 A * | 5/1985 | Hutchison | ............ | H02G 3/0616 29/858 |
| 4,549,755 A * | 10/1985 | Kot | ....................... | H02G 3/0658 285/341 |
| 4,629,825 A * | 12/1986 | Lackinger | ............ | H02G 3/0641 174/654 |
| 5,059,747 A * | 10/1991 | Bawa | .................... | H02G 3/0675 174/541 |
| 5,951,327 A * | 9/1999 | Marik | ................... | H01R 13/426 439/607.44 |
| 6,162,995 A * | 12/2000 | Bachle | ................... | H02G 3/088 285/322 |
| 6,354,851 B1 * | 3/2002 | Bachle | ................... | H02G 15/04 174/650 |
| 6,682,355 B1 * | 1/2004 | Gretz | ..................... | H02G 3/083 439/98 |
| 7,156,671 B2 * | 1/2007 | Kauth | ...................... | H01R 4/66 439/98 |
| 8,034,325 B2 * | 10/2011 | Crutchley | ................ | A61K 8/11 427/244 |
| 8,698,011 B2 * | 4/2014 | Schlegel | ............... | H02G 3/0675 277/606 |

(Continued)

*Primary Examiner* — Timothy J Thompson
*Assistant Examiner* — Michael F McAllister
(74) *Attorney, Agent, or Firm* — LEYDIG, VOIT & MAYER, LTD.

(57) ABSTRACT

A cable gland for an armored cable comprising at least an exposed portion of the armor, comprising a clamping ring and a compression ring intended to be tightened or rotatably engaged to each other, said cable gland comprises a current conducting circular member, intended to surround the exposed portion of the armor of said cable and being attached at one end to the compression ring and at another end to the clamping ring, so that when the clamping ring and a compression ring are tightened or rotatably engaged to each other, the circular member is collapsed against an exposed portion of the armor of the cable.

11 Claims, 7 Drawing Sheets

(56) References Cited

U.S. PATENT DOCUMENTS

| | | | | |
|---|---|---|---|---|
| 8,779,304 B2 * | 7/2014 | Spilker | ............... | H02G 3/0616 |
| | | | | 174/653 |
| 2005/0269122 A1 * | 12/2005 | Pyron | .................. | H02G 3/0691 |
| | | | | 174/666 |
| 2007/0079983 A1 * | 4/2007 | Pyron | .................. | H02G 3/0691 |
| | | | | 174/78 |
| 2013/0153290 A1 * | 6/2013 | Schlegel | ............. | H02G 3/0658 |
| | | | | 174/653 |
| 2013/0256467 A1 * | 10/2013 | Aumiller | ............. | H01R 13/187 |
| | | | | 248/49 |

* cited by examiner

CABLE GLAND FOR ARMORED CABLE

CROSS-REFERENCE TO RELATED APPLICATIONS

This application claims priority pursuant to 35 U.S.C. 119(a) to Indian Application No. 202111046444, filed Oct. 12, 2021, which application is incorporated herein by reference in its entirety.

FIELD

The invention relates to the field of cable gland.

BACKGROUND

Cable gland assemblies are used for terminating cable in hazardous and nonhazardous environments.

More specifically, cable gland assemblies generally provide a means for terminating cables, such as unarmored cables (e.g., TC-type) and armored cables, at junction boxes, control centers, panelboards, enclosures, and the like.

Typical cable gland assemblies provide a seal around the cable, mechanical retention of the cable therein, electrical continuity via the termination of the armor.

In the case of armored cables, the cable gland usually comprises means to clamp the armor of the cable in order to ground the armor and participate to the retention of the cable in the gland.

An armored cable comprises a plurality of conductor wires 22 and an armor 21, separated by an internal layer, not represented, the armor being also covered by an outer layer.

The armor 21 can be made for instance of a plurality of metal wires, metal sheets, metal mesh, etc., covering the entire circumference of the conductor 22.

Figure 1:
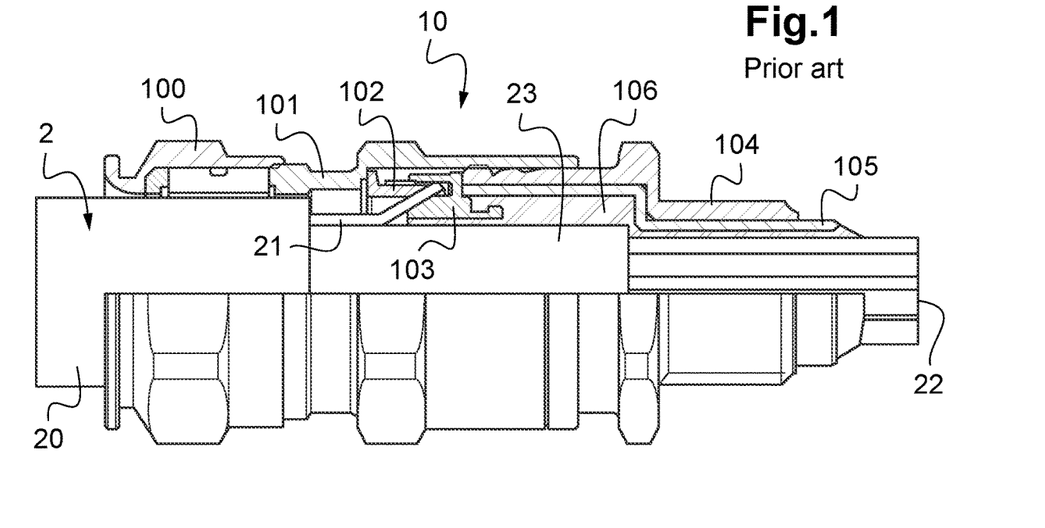
FIG. 1 is a longitudinal view of cable gland of the prior art.

The cable glands 10 of the prior art, as shown in FIG. 1, comprise a body 104 intended to be mounted on a threaded or non-threaded entry of enclosure.

In this body 104 a compound chamber 105 is installed. The compound chamber 105 receive a compound 106, generally an Epoxy compound. This compound chamber 105 is inserted into the body 104, and a compression ring 103 is pressed on the compound chamber 105 in order to compress the compound 106, which becomes rigid in a few hours.

The armored cable 2 is prepared to be inserted through the cable gland 10. For this purpose, on the portion intended to pass through the cable gland 10, the cable is stripped of its outer layer, then the armor is cut and bent at a predefined angle, generally about 30°, in order to be inserted into a recess formed in the compression ring 103.

A clamping ring 102 is then pushed into the compression ring 103 by fastening an internal nut 101 to the body 104 to clamp the armor 21 and hold it firmly in place.

This clamping of the armor helps to keep the cable 2 in place in the cable gland 10, but above all it allows the armor 21 of the cable 2 to be grounded, by conduction of the armor 21, through the compression ring 103 and the clamping ring 102, to the body 104, which is itself connected to ground.

An internal nut 101 is mounted over the clamping ring 102 and the compression ring 103, and comes in contact with the body 104 via a threaded connection or fastened to the body 104.

Then an external nut 100 is screwed on the internal nut 101 to have an IP seal with cable's outer surface. In this context IP is a standard abbreviation for Ingress Protection.

This type of armor clamping imposes a relatively long and tedious preparation, requiring to remove the outer layer of the cable 2, to bend the armor wires 21 at a predetermined angle, and then to cut these wires to the desired length. Then the armor must be inserted in a recess of the compression ring 103 and clamped by pushing the clamping ring 102 into the compression ring 103 by applying torque on internal nut 101.

Therefore, there is a need for an easier way to clamp the armor 21 of the cable 2 in a cable gland.

SUMMARY OF THE INVENTION

A cable gland for an armored cable comprising at least an exposed portion of the armor, comprising a clamping ring and a compression ring intended to be tightened or rotatably engaged to each other.

The cable gland comprises a current conducting circular member, intended to surround the exposed portion of the armor of said cable and being attached at one end to the compression ring and at another end to the clamping ring, so that when the clamping ring and a compression ring are tightened or rotatably engaged together, the circular member is collapsed against the exposed portion of the armor of the cable.

In particular, said circular member is made of a flexible metal blade or a flexible wire.

In a first embodiment of the invention, said circular member comprises at each end a fastening portion forming a hook, each hook being intended to engage in a notch formed respectively in said clamping ring and said compression ring so as to be maintain attached to each ring while they are tightened or rotatably engaged to each other, allowing the circular member to collapse on the armor under the effect of the rotation of one ring with respect to the other.

In a second embodiment of the invention, said circular member comprises at each end a fastening portion forming a loop, each loop being intended to engage between two notches formed respectively in said clamping ring and said compression ring so as to be maintain attached to each ring while they are tightened or rotatably engaged to each other, allowing the circular member to collapse on the armor under the effect of the rotation of one ring with respect to the other.

Especially, the circular member is a helical member.

Alternatively, the circular member comprises a first portion and a second portion, said first portion being larger than the second portion and comprising an opening so the second portion pass through said opening.

In a third and fourth embodiment of the invention, said cable gland comprises anti-loosening means for preventing loosening between the compression ring and said clamping ring after they have been tightened or rotatably engaged to each other.

Particularly, said anti-loosening means comprising on the one hand a toothed portion mounted on the outer circumference of a first ring amongst the compression ring and the clamping ring, the second ring comprising an anti-reverse pawl engaging said toothed portion when the two rings are tightened or rotatably engaged to each other.

In the third embodiment of the invention, said toothed portion is formed on the outer circumference of the first ring, the anti-reverse pawl being mounted on the second ring projecting longitudinally in order to cover and engage the toothed portion.

In the fourth embodiment of the invention, the toothed portion is formed on a flange projecting on the outer circumference of the second ring.

Advantageously, said anti-reverse pawl is made of a removable body engaging in an insertion notch formed in the second ring.

DETAILED DESCRIPTION

Figure 2:
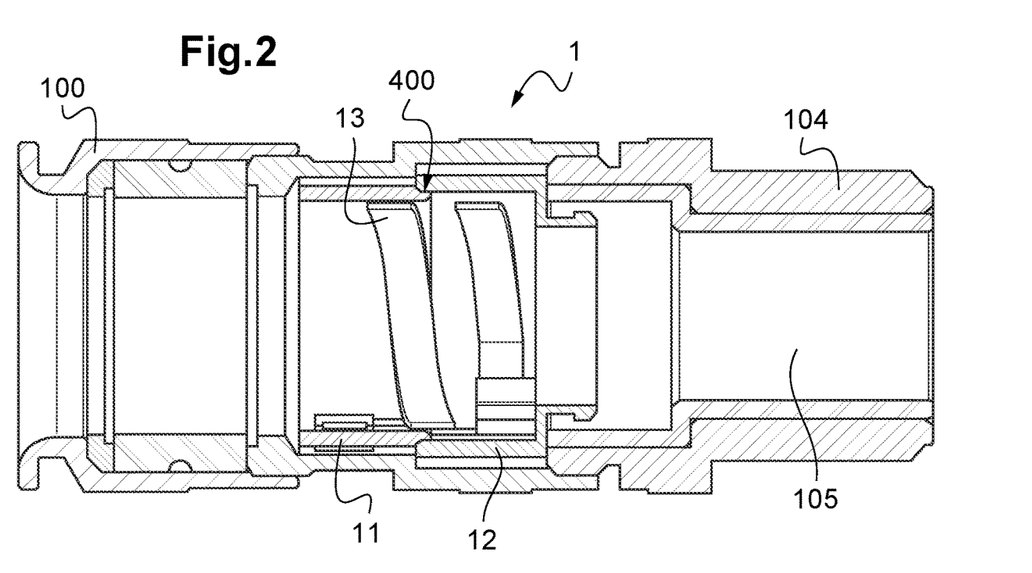
FIG. 2 is a longitudinal view of a cable gland according to a first embodiment of the invention.
Figure 4:
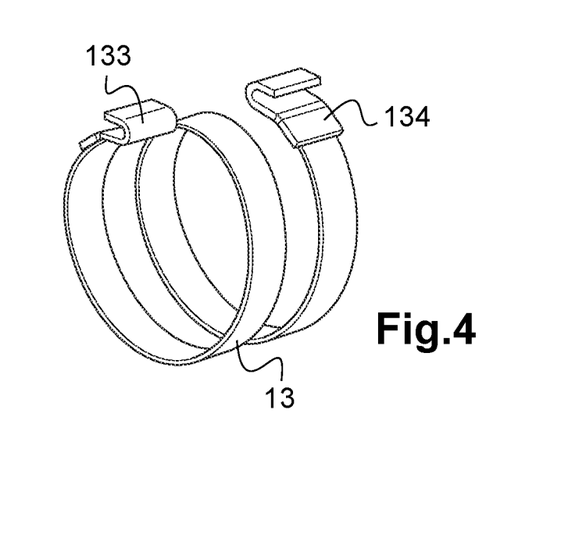
FIG. 4 is a view of a second type of helical member according to the invention.
Figure 5:
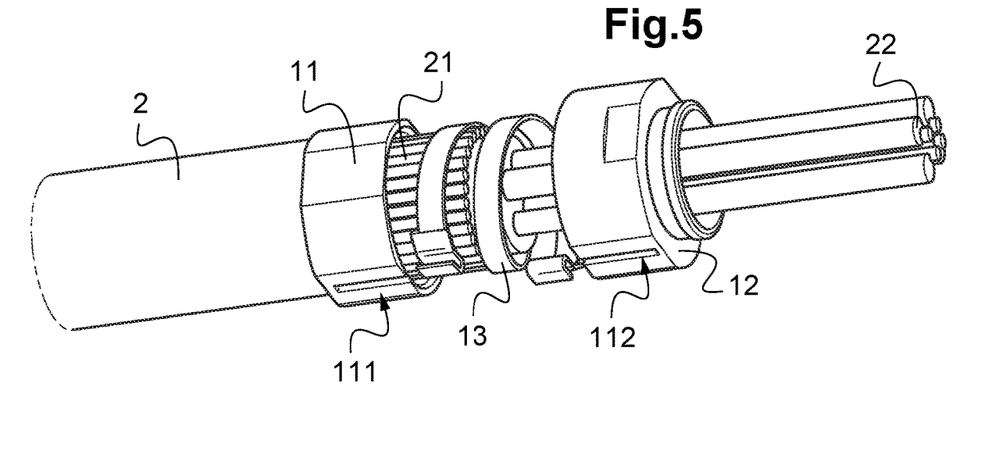
FIG. 5 is an exploded-view of the armor clamping mechanism according to the first embodiment of the invention.

In the first embodiment of the invention with reference to FIGS. 2, 4 and 5, the cable gland 1 comprises a circular member 13, in this embodiment a helical member 13 made of a current conducting material, intended to encircle the exposed armor 21 of the cable 2.

In this first embodiment, this helical member 13 is made of a flexible metal blade comprising at each end a fastening means 133, 134 in the form of a rigid hook 133, 134.

Each rigid hook 133, 134 is welded to one of the ends of the helical member.

However, the fastening of the hooks 133, 134 is not limited solely to welding, as these hooks can be riveted or fixed by any other means known in the prior art.

Figure 3:
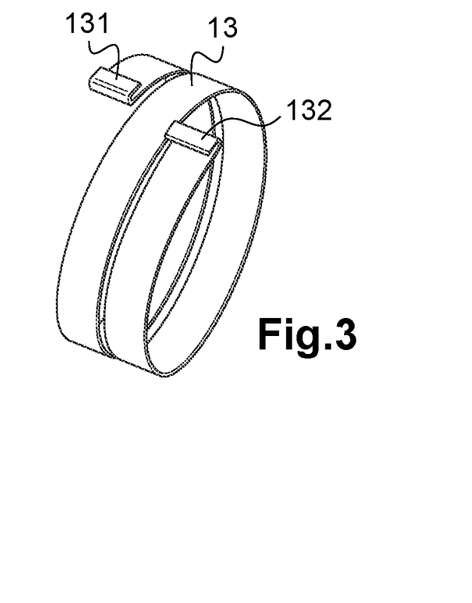
FIG. 3 is a view of a first type of helical member according to the invention.

According to an alternative embodiment of this helical member, with reference to FIG. 3, the hooks 131, 132 are obtained in one piece with the helical member 13.

The hooks, 131-134 are then shaped to be inserted into notches formed in the compression ring 12 and in the clamping ring 11.

These notches extend in an axial direction with respect to the axis of revolution of each of the rings, the hooks being shaped to pass through these notches.

Once each end hook of the helical member is inserted in a notch 111, 112, respectively in a clamping ring 11 and in a compression ring 12, the screwing of the clamping ring 11 on the compression ring 12 will cause a torsion of the helical member 13, making it collapse against the cable armor 21.

The helical member 13 is flexible but is not intended to be elastic.

Indeed, the helical member 13 is designed to be collapsed around the armor 21 and is not intended to be released afterward unless required.

The clamping ring 11 is rotatably engaged, like screwed, on the compression ring 12 with a threaded connection between these two rings.

Thus, it is well known that the compression ring 12 comprises an internal thread and the clamping ring 11 comprises an external thread, both being adapted to engage each other so as to be pressed together to a predefined limit.

However, the invention could be implemented just as well if the internal thread was made on the clamping ring 11 and the external thread was made on the compression ring 12, the cooperation of these two elements being similar.

The orientation of the helices of the helical member 13 must be conformed so that, once mounted on the clamping ring 11 and compression ring 12, it is compressed against the armor when the two rings 11, 12 are rotatably engaged together, for instance screwed together.

Thus, by such a solution it is not necessary to bend the armor 21 and insert it in a recess of the compression ring 103 as in the prior art, because the armor 21 is encircled by the helical member 13, the electrical contact being moreover regularly distributed on all the circumference of the armor 21.

In addition, the collapse of the helical member 13 against the armor 21 creates a frictional force that helps to maintain the cable 2 in position in the cable gland.

Figure 6:
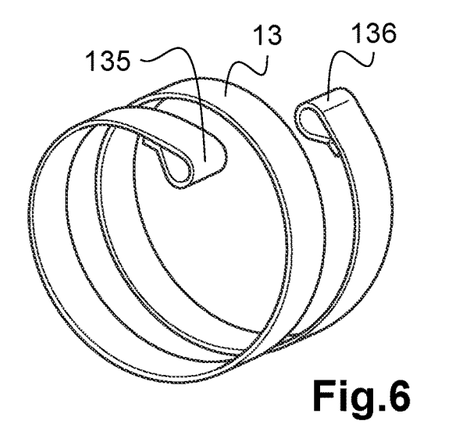
FIG. 6 is a view of a third type of helical member according to the invention, used for the armor clamping in cable gland according to a second embodiment of the invention.
Figure 7:
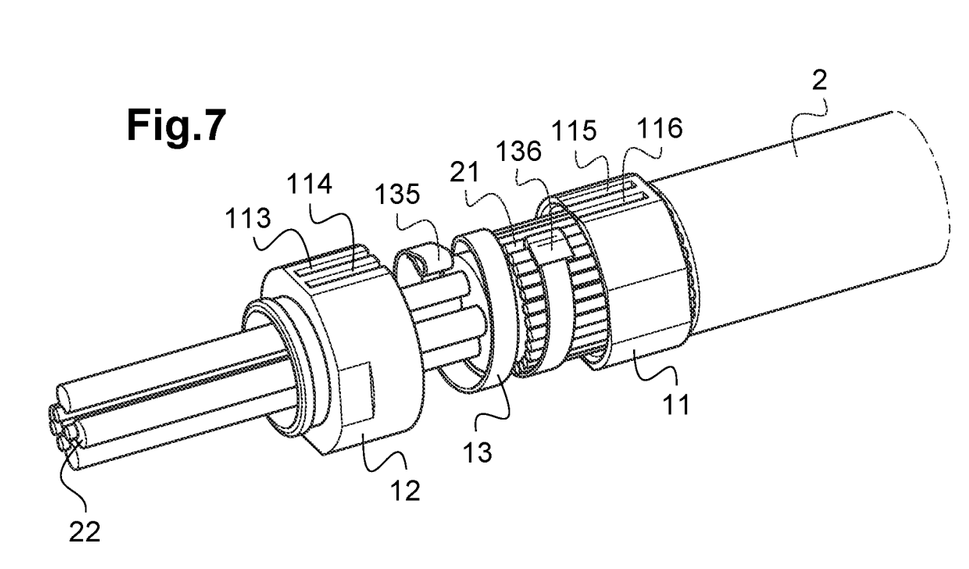
FIG. 7 is an exploded-view of the armor clamping mechanism according to the second embodiment of the invention.

According to a second embodiment of the invention with reference to FIGS. 6 and 7, the general structure of the compression ring 12 and clamping ring 11 as well as the helical member 13 are similar to the structure of the first embodiment.

However, in this second embodiment, each end of the helical member 13 comprises a loop 135, 136, closed on itself.

This loop 135, 136 is in this embodiment obtained in one piece with the helical member 13, the closing of the loop being then carried out by a welding point.

However, the invention is not limited to this single way of obtaining the loop 135, 136, which could be obtained separately from the helical member 13 and then welded or riveted at each of its ends. In this way, the loops could be made of a different conductive material than the helical member 13, for example of a more rigid conductive metal.

In order to secure these loops to the compression ring 12 and clamping ring 11, each of these rings 11, 12 includes two notches 113, 114, 115, 116 spaced apart by a distance less than or equal to the length of the opening of each loop 135, 136.

These notches 113-116 extend in a main direction parallel to the axis of penetration of the cable 2 in the gland 1.

Each loop 135, 136 then engages in the two notches 113, 114 and 115, 116 of each ring 11, 12, and so as to collapse against the armor when the two rings are fastened together.

Figure 8:
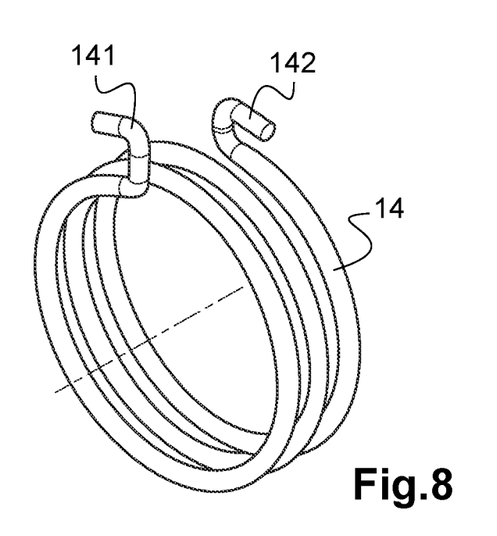
FIG. 8 is a view of a fourth type of helical member according to the invention.

In each of the embodiments of the invention, the helical member 13 is not necessarily made of a flexible metal blade, but could also be made of a material with a circular cross-section, such as a metal wire, semi-rigid, flexible or soft, as shown in FIG. 8. Such a helical member 13 being compatible with hooked or looped ends as discussed above.

A flexible metal wire can be, for instance, an accelerator cable with die cast ends.

Figure 9:
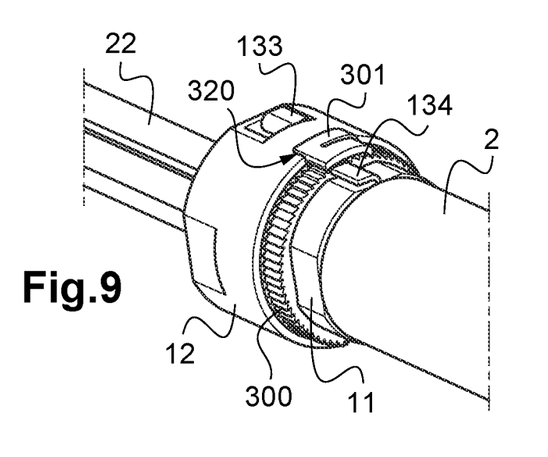
FIG. 9 is a view of a tightened armor clamping mechanism according to a third embodiment of the invention.
Figure 10:
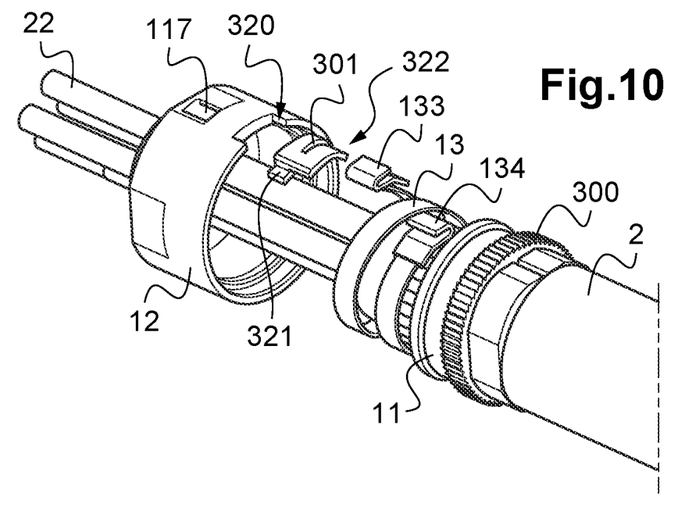
FIG. 10 is an exploded-view of the armor clamping mechanism according to the third embodiment of the invention.

According to a third embodiment of the invention, with reference to FIGS. 9 and 10, the helical member 13 is made in the same way as in the first or second embodiment, the fastening means being able to be either hook or loop.

However, the objective of this third method is to avoid the resisting force of the collapsed helical member 13 tightened against the armor 21 cause a loosening between the compression ring 12 and the clamping ring 11.

Also, anti-loosening means 300, 301 are installed, intended to prevent the unscrewing of the compression ring 12 and the clamping ring 11 after they have been rotatably engaged together.

In this third embodiment, the anti-loosening means 300, 301 comprise a toothed portion 300, formed on an outer circumference of the clamping ring 11, and an anti-reverse pawl 301, attached to the compression ring 12

The toothed portion 300 extends around the whole outer circumference of at least a section of the clamping ring 11.

Since the anti-reverse pawl 301 must comprise at least a flexible extremity, it cannot be obtained in one piece with the compression ring 12, which must necessarily be made of a rigid metallic material.

Therefore, the compression ring 12 includes an insertion notch 320 for receiving the anti-reverse pawl 301. The anti-reverse pawl 301 comprises orthoradial tabs 321, 322 engaging towards the interior of the compression ring 12 on either side of the insertion notch 320.

Thus, the anti-reverse pawl 301 can be installed relatively easily and effectively on the compression ring 12.

As the clamping ring 11 is screwed to the compression ring 12, the anti-reverse pawl 301 progresses along the toothed portion 300, and prevents any reversal. At the same time, the helical member 13 progressively collapses against the cable 2 the armor 21, which makes it possible to obtain a particularly effective tightening of the armor 21.

In other words the toothed portion 300 and the anti-reverse pawl 301 is forming a ratchet.

It should be noted that this third mode of realization can also be achieved by installing the toothed portion 300 on the clamping ring 12 and the anti-reverse pawl 301 on the compression ring 11 only the inversion of these elements being necessary to be able to operate, which can be easily achieved on reading the above.

Figure 11:
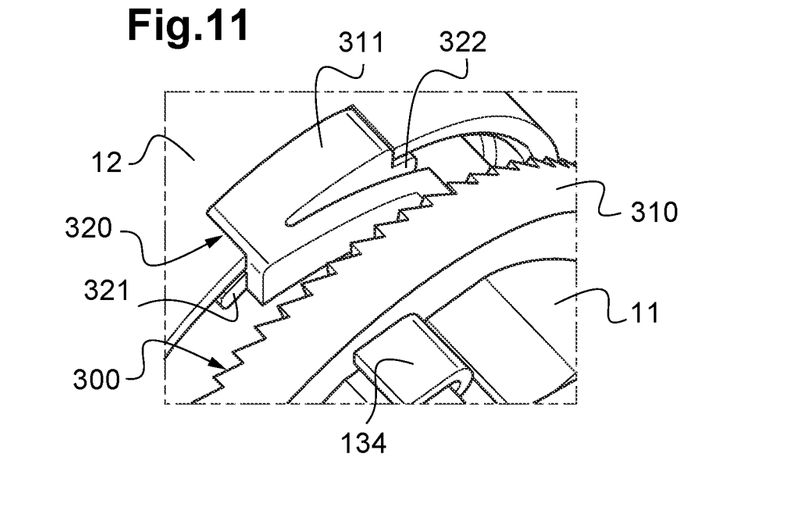
FIG. 11 is a detailed view of the anti-loosening means of a fourth embodiment of the invention.
Figure 12:
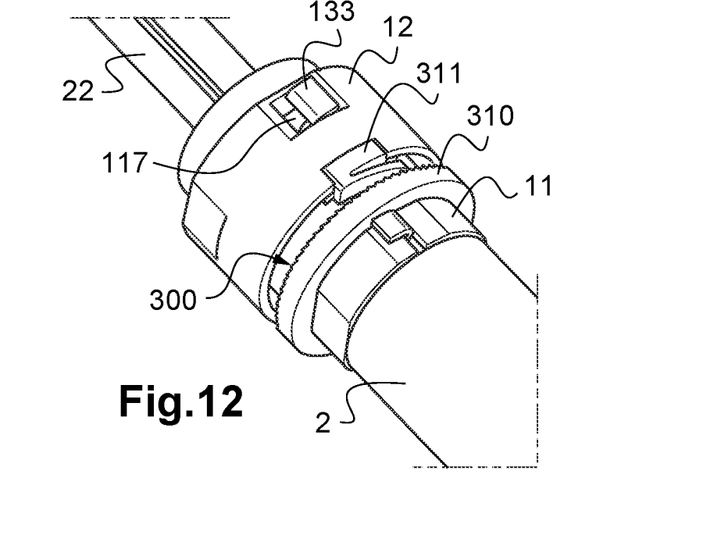
FIG. 12 is a view of a tightened armor clamping mechanism according to the fourth embodiment of the invention.
Figure 13:
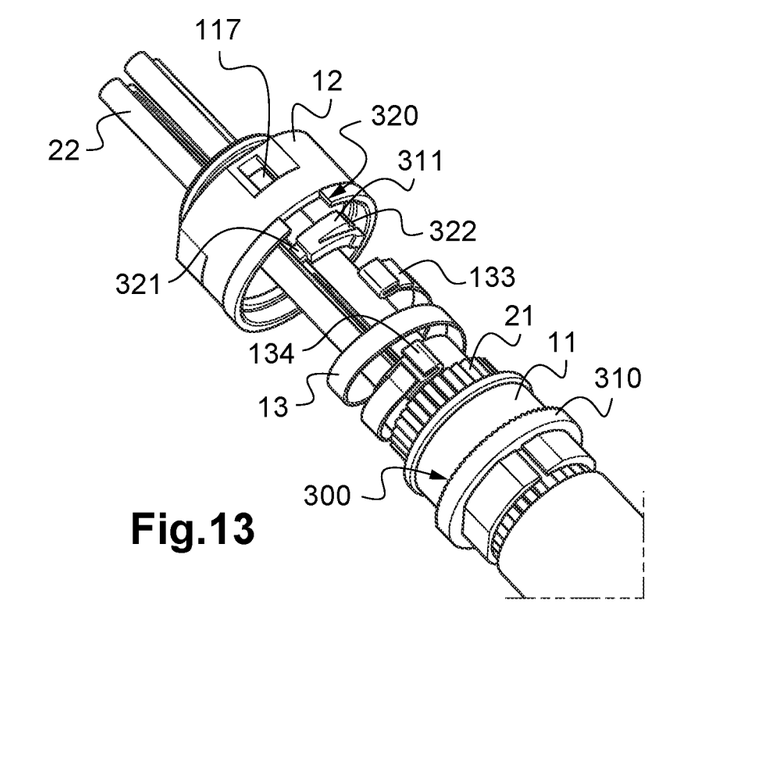
FIG. 13 is an exploded-view of the armor clamping mechanism according to the fourth embodiment of the invention.

According to a fourth embodiment, which is a variation of the third embodiment, with reference to FIGS. 11 to 13, the toothed portion 300 is this time formed on a flange 310 forming a circumferential projection on the outer circumference of the clamping ring 11, the toothed portion being oriented so as to be on opposite of the anti-reverse pawl 311.

In other words, the teeth of the toothed portion extend in the direction of the compression ring 12, while the anti-reverse pawl 311 is oriented in the direction of the flange 310, so as to come into contact with the toothed portion 300 when the two rings are tightened or rotatably engaged together.

As in the third embodiment, the compression ring 12 includes an insertion notch 320 for receiving the anti-reverse pawl 311. The anti-reverse pawl 311 includes ortho-radial tabs 321, 322 that engage inwardly with the compression ring 12 on either side of the insertion notch 320.

Thus, the anti-reverse pawl 311 can be installed in a relatively simple and effective manner on the compression ring 12.

It should be noted that this fourth embodiment, like the third embodiment, can be achieved by installing the toothed portion 300 on the compression ring 12 and the anti-reverse pawl 311 on the clamping ring 11, with only the inversion of the elements being necessary to be able to operate, which can be easily achieved upon reading the above.

Figure 14:
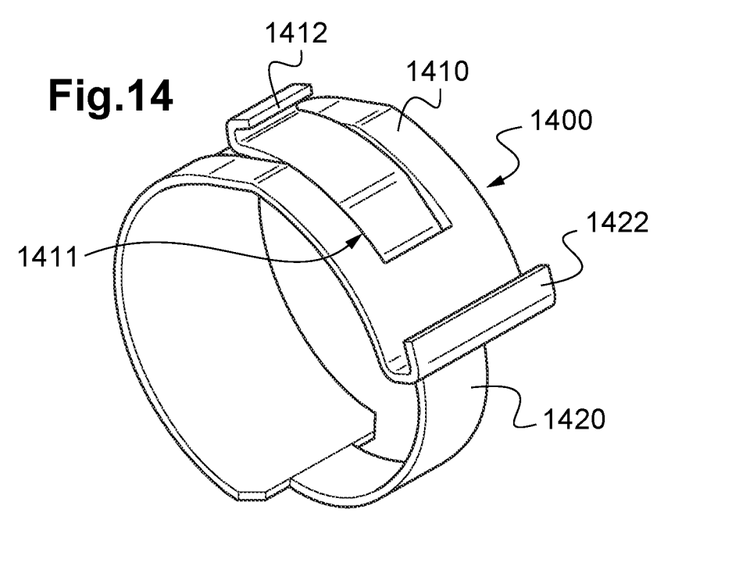
FIG. 14 is a view of a circular member according to a fifth embodiment of the invention.

In a fifth embodiment of the invention, the circular member 1400 is a variation of the circular member 13 of the first embodiment of the invention.

In this fifth embodiment the circular member 1400 is made of a band of material comprising a first portion 1410 and a second portion 1420, the first portion 1410 being wider than the second portion 1420. The first portion 1410 comprising an opening 1411, here a rectangular opening 1411.

This opening 1411 is at least as wide as the second portion 1420 so the second portion 1420 can pass through this opening 1411.

The circular member 1400 comprises one extremity on the first portion 1410 and a second extremity on the second portion 1420.

Each extremity comprises a hook 1412, 1422 as exposed in FIG. 14 but can comprises any other kind of fastening means, like loops 135, 136 as exposed for the previous embodiment of the invention.

In other words, this circular member 1400 is a kind of self-penetrating band forming a loop to collapse around the cable and two extremities each one comprising a hook 1412, 1422 that can be engaged, as for the previous embodiments, in a notch 111, 112 formed respectively in the clamping ring 11 and the compression ring 12.

This circular element 1400 can be used instead of the helical element 13 exposed before for any of the previously exposed embodiment of the invention.

As for the helical member 13 this self-penetrating circular member 1400 is designed to be collapsed around the armor 21 and is not intended to be released afterward unless required.

What is claimed is:

1. A cable gland for an armored cable comprising at least an exposed portion of the armor, comprising a clamping ring and a compression ring intended to be tightened or rotatably engaged to each other, wherein said cable gland comprises a current conducting circular member, intended to surround the exposed portion of the armor of said cable and being attached at one end to the compression ring and at another end to the clamping ring, so that when the clamping ring and a compression ring are tightened or rotatably engaged together, the circular member is collapsed against the exposed portion of the armor of the cable.

2. The cable gland according to claim 1, wherein said circular member is made of a flexible metal blade or a flexible wire.

3. The cable gland according to claim 1, wherein said circular member comprising at each end a fastening portion forming a hook, each hook being intended to engage in a notch formed respectively in said clamping ring and said compression ring so as to be maintain attached to each ring while they are tightened or rotatably engaged to each other, allowing the circular member to collapse on the armor under the effect of the rotation of one ring with respect to the other.

4. The cable gland according to claim 1, wherein said circular member comprises at each end a fastening portion forming a loop, each loop being intended to engage between two notches formed respectively in said clamping ring and said compression ring so as to be maintain attached to each ring while they are tightened or rotatably engaged to each other, allowing the circular member to collapse on the armor under the effect of the rotation of one ring with respect to the other.

5. The cable gland according to claim 1, wherein the circular member is a helical member.

6. The cable gland according to claim 1, wherein the circular member comprises a first portion and a second portion, said first portion being larger than the second portion and comprising an opening so the second portion pass through said opening.

7. The cable gland according to claim 1, wherein said cable gland comprises anti-loosening means for preventing loosening between the compression ring and said clamping ring after they have been tightened or rotatably engaged to each other.

8. The cable gland according to claim 7 wherein said anti-loosening means comprising on the one hand a toothed portion mounted on the outer circumference of a first ring amongst the compression ring and the clamping ring, the second ring comprising an anti-reverse pawl engaging said toothed portion when the two rings are tightened or rotatably engaged to each other.

9. The cable gland according to claim 8 wherein said toothed portion is formed on the outer circumference of the first ring, the anti-reverse pawl being mounted on the second ring projecting longitudinally in order to cover and engage the toothed portion.

10. The cable gland according to claim 8 wherein said anti-reverse pawl is made of a removable body engaging in an insertion notch formed in the second ring.

11. The cable gland according to claim 8, wherein the toothed portion is formed on a flange projecting on the outer circumference of the second ring.

\* \* \* \* \*